United States Patent [19]

Surauer et al.

[11] Patent Number: 4,914,564
[45] Date of Patent: Apr. 3, 1990

[54] ADAPTIVE CONTROL SYSTEM OF HIGH ACCURACY AND LOW CORRECTIVE ENERGY CONSUMPTION

[75] Inventors: Michael Surauer, Chieming; Helmut Bittner, Munich, both of Fed. Rep. of Germany

[73] Assignee: Messerschmitt-Bolkow-Blohm Gesellschaft mit beschränkter Haftung, Ottobrunn, Fed. Rep. of Germany

[21] Appl. No.: 126,939

[22] PCT Filed: Feb. 27, 1987

[86] PCT No.: PCT/DE87/00075

§ 371 Date: Oct. 28, 1987

§ 102(e) Date: Oct. 28, 1987

[87] PCT Pub. No.: WO87/05411

PCT Pub. Date: Sep. 11, 1987

[30] Foreign Application Priority Data

Feb. 28, 1986 [DE] Fed. Rep. of Germany ....... 3606640

[51] Int. Cl.$^4$ .......................... G06F 1/00; G06F 15/20
[52] U.S. Cl. .................................... 364/153; 364/183; 364/148
[58] Field of Search ............... 364/148, 153, 154, 155, 364/183

[56] References Cited

U.S. PATENT DOCUMENTS

| | | | |
|---|---|---|---|
| 4,463,432 | 7/1984 | Carter | 364/153 |
| 4,509,110 | 4/1985 | Levesque | 364/153 |
| 4,604,681 | 8/1986 | Sakashita | 364/154 |

FOREIGN PATENT DOCUMENTS

| | | |
|---|---|---|
| 2354916 | 5/1975 | Fed. Rep. of Germany . |
| 3207815 | 9/1983 | Fed. Rep. of Germany . |

Primary Examiner—Michael R. Fleming

[57] ABSTRACT

A control system having a main loop comprising a deadband section having variable thresholds. An adaptive network derives from a deviation signal, in one or more selected frequency ranges, by averaging, an adaptive signal which when injected into the deadband section allows its thresholds to be continuously or discretely adjusted in accordance with a desired function to increase the accuracy and reduce the corrective energy consumption of the control system.

16 Claims, 6 Drawing Sheets

ADAPTIVE CONTROL SYSTEM OF HIGH ACCURACY AND LOW CORRECTIVE ENERGY CONSUMPTION

FIELD OF THE INVENTION

The invention relates to the improvement of the accuracy and stability of control systems with a particularly low energy requirement. In addition to the components characteristic of every control loop, namely (see FIG. 1), a suitable measuring element (12) for determination of the deviations of the system to be controlled, the controlled system (16), from its desired state, a controller network (13) (or a control algorithm corresponding to its function in a programmable digital electronic system) and a final-control-element assembly (15) generating the forces or moments required for control, control loops of low corrective energy consumption of the type here considered further comprise a dead-band section (14), which usually is disposed between the controller network (13) and the final control element (15).

BACKGROUND OF THE INVENTION

A dead-band section is defined with respect to its transfer characteristics in that in the case of input quantities whose magnitude is below a certain preset threshold value it does not supply an output signal whereas it reproduces the input-signal components which exceed the threshold values unchanged so far as their frequency and phase are concerned, though with the amplitude reduced by the constant magnitude of the threshold value.

In addition to dead-band sections of the above type, there are a number of control-loop components with a high degree of nonlinearity which serve for the execution of switching functions, for example, hysteresis elements, relay or three-point elements, which may likewise incorporate preset response thresholds, with the latter, however, serving primarily to secure unambiguous circuit states. The introduction of an artificial dead band into a control loop has a beneficial effect on corrective energy consumption only because the final control elements are not actuated so long as the deviations are below the response threshold of the dead-band section. Only when external disturbances or dynamic events in the control loop give rise to deviations which result in an overshooting of the response thresholds of the dead-band section are forces and/or moments generated which tend to reduce the deviation, but only until the response thresholds are again undershot. Especially during periods and operating conditions when external disturbances affecting the controlled system are slight, the system will remain within the range of the dead band for a relatively long time and consume no corrective energy.

Now from these basic facts it follows directly that the absolute value of the response threshold is a direct measure of the attainable accuracy of the control system, and that the demands for saving corrective energy and for accuracy conflict with each other. While the accuracy increases when the range of the dead band is increased, the frequency of corrective interventions also increases, and with it the consumption of energy. If, on the other hand, the deadband is dispensed with altogether, the final control elements will be actuated even by the unavoidable system and measured-value noise, and an increase in accuracy will be limited by the increasing stochastic excitation of the control-loop dynamics. Moreover, the noise level in a control system, that is, signal noise and system dynamics, is dependent, apart from external disturbances, in large measure on environmental and operating conditions, such as temperature fluctuations, parameter tolerances, aging processes and the like, which results in a sizable range of variation and considerable uncertainty in the system behavior of conventional control loops and does not permit the setting up of a fixed dead band that is optimally adjusted to changing operating conditions. Thus, once a dead band has been set to a fixed value allowing in particular for the high-frequency noise level for nominal conditions, the "effective dead band", that is, the actually effective deadband range remaining between noise amplitudes and threshold value, changes in an inverse ratio to the magnitude of the disturbing noise, and the behavior of the control loop with respect to accuracy and corrective energy required changes with it. On the other hand, the effective component of an artificial dead band of non-negligible size represents in control loops in every case a substantially nonlinear, and more particularly a discontinuous, transfer element which under certain operating conditions results in limit-cycle vibrations. In linear systems, that is, in control loops whose components —the controlled system, sensors and final control elements—can be described with sufficiently good approximation through linear or linearized transfer elements, pains are therefore taken to avoid the introduction of artificial dead bands. In such cases, the influence of the measured-value noise is usually suppressed so far as possible by means of linear low-pass filters, which, however, has an adverse effect on system stability since low-pass filters inevitably result in phase losses.

Limit-cycle vibrations should generally be regarded as particularly critical when they occur in control loops whose controlled systems include components capable of vibrating, especially elastic structural elements. This is the case particularly with air- and spacecraft, because of their light, weight-saving construction and/or large physical size.

Because of the extremely low self-damping of such structural vibrations, control systems for elastic vehicles of this type tend to be excited to limit-cycle vibrations whose frequencies coincide with the structural resonance frequencies, which may result in dangerous vibration excitation, excessively high mechanical structure loading, and ultimately the destruction of the vehicles.

Moreover, intermittently operating final control elements such as stepper motors or pulsed jet nozzles are frequently employed to produce the forces and/or moments required for stabilization, and their sudden intervention in the system promotes resonance excitations over a broad spectrum of frequencies. In the case of attitude control systems for vehicles of this type, so-called modal controllers have therefore been proposed, that is, the controller networks or algorithms commonly employed in the past for the simultaneous damping of every mode of natural vibration are expanded to include a second-order observer and an associated state controller. Aside from the high complexity, which increases with the number of modes of vibration to be allowed for, and from the cost of realization of the controller, such concepts in practice are rendered largely ineffective by unavoidable mismatching of the observers due to uncertainty and range of variation of the modal parameters.

To prevent the excitation of structural resonances in another case, the hysteresis range of the hysteresis element of a pulse-duration/pulse-frequency modulator employed for the pulsing of jet nozzles was adaptively modified in such a way that the repetition rate of the corrective interventions does not coincide with a structural resonance frequency. With this technique, the intervention in a highly nonlinear element of the modulator circuit, namely, its hysteresis element, simultaneously alters the amplitude and phase ratios in a manner that is difficult for a control engineer to follow and can only be determined approximately by complicated analytical methods.

SUMMARY OF THE INVENTION

The object of the present invention is to provide, by as simple means as possible, improved control systems which assure, regardless of the instantaneous operating and environmental conditions and the attendant fluctuations of the parameters and signal relationships, a consistently high quality of control, that is, high accuracy and low corrective energy demand, without a deterioration of the stability conditions or, worse yet, a potential resonance excitation of controlled systems capable of vibrating having to be tolerated at the same time.

In accordance with the invention, this object is accomplished in that the values of the response thresholds of the dead-band section, usually disposed between the controller and the final control element, are adjustable continuously or in discrete increments between a preset fixed lower limit and a variable upper limit which does not exceed a predetermined maximum. More particularly, the adjustment of the values of the response threshold is to take place in the same direction on the basis of a signal derived from the controller output signal or from the deviation by averaging all signal components located within one or more selected frequency ranges. The adjustment may be effected automatically, manually, continuously or in discrete increments. The invention can be used to advantage in both linear and highly nonlinear control systems and assures in every case the maintenance of optimal operating conditions with changing environmental conditions and parameter fluctuations.

DESCRIPTION OF DRAWINGS

The essential characteristics of the invention will now be described in greater detail, using the prior art (FIGS. 1 to 3) as a point of departure, in terms of exemplified embodiments (FIGS. 4 to 12), with FIG. 1 showing a block diagram of a control system of high accuracy and low corrective energy consumption of conventional design;

FIG. 9-12 showing a further control system in accordance with the invention.

PRIOR ART DESCRIPTION

Figure 1:
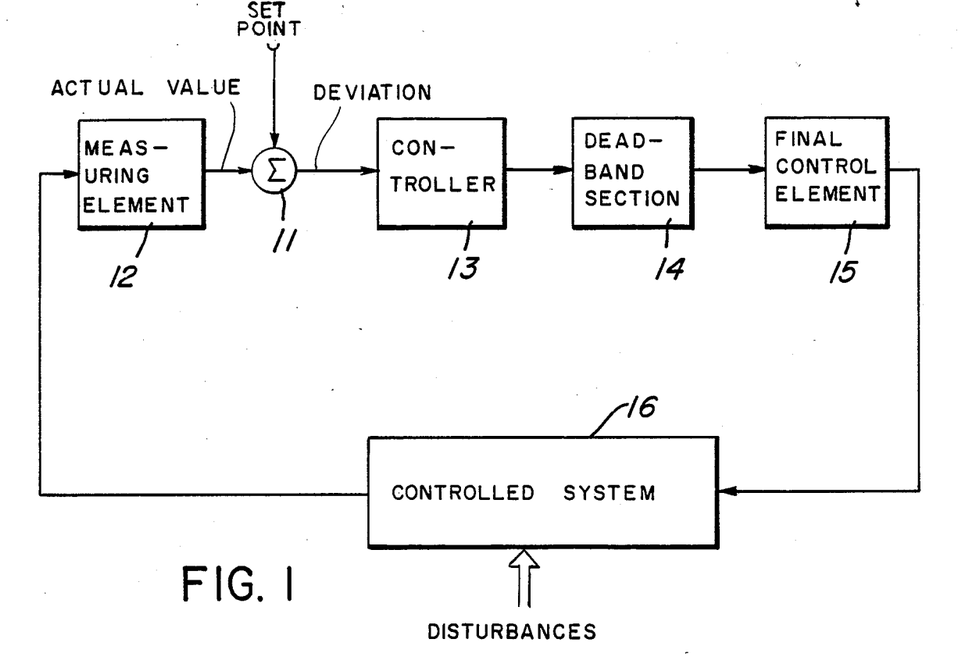
Figures 2, 3:
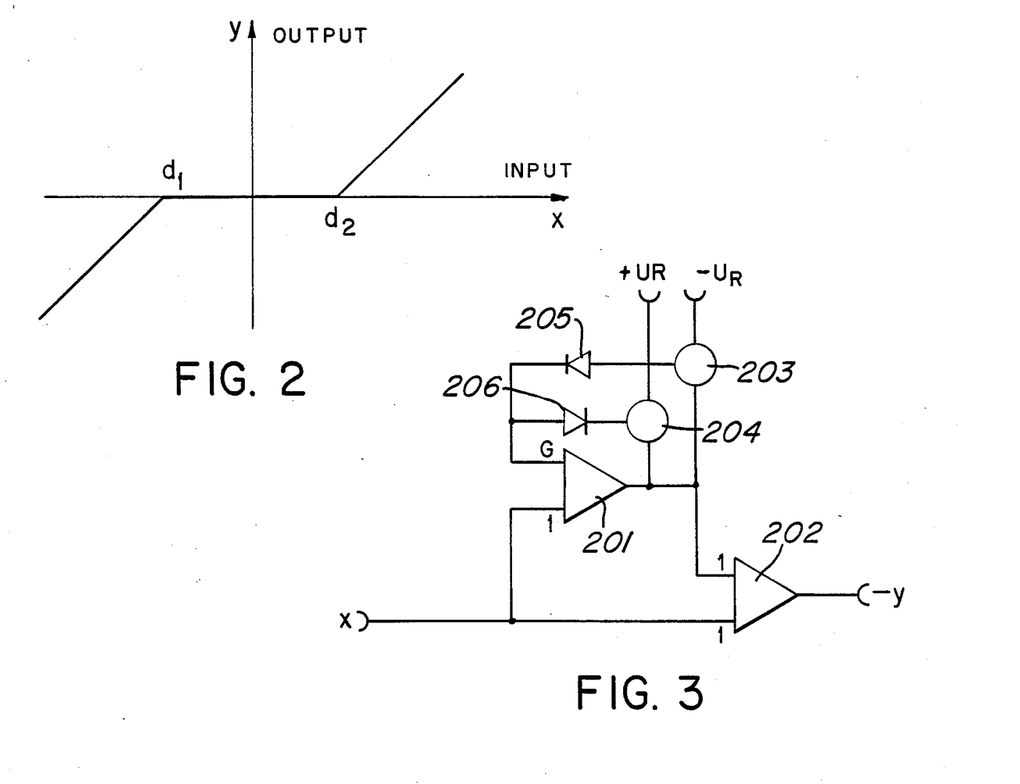
FIG. 2 showing an input/output characteristic of a dead-band section of known design.
FIG. 3 showing a functional diagram for a dead-band section of known design.

The basic design of a conventional control loop of low corrective energy consumption according to FIG. 1 and its principle of operation have already been described at the outset. The transfer characteristic of a dead-band section is reproduced in FIG. 2. Its mathematical function definition is as follows:

$$y = \begin{array}{ll} x - d_1 & \text{fur } x < d_1 < 0 \\ 0 & \text{fur } d_1 \leq x \leq d_2 \\ x - d_2 & \text{fur } x > d_2 > 0 \end{array} \quad (1)$$

When the dead band is implemented as an algorithm in a programmable digital electronic control system, this mathematical function definition directly furnishes the rule for computing a numerical value.

FIG. 3 shows a possible hardware implementation of a conventional dead-band section with fixed response thresholds ($d_1$, $d_2$) using operational amplifiers (201, 202), feedback potentiometers (203, 204) and diodes (205, 206). The positive threshold ($d_2$) is determined by the value to which the potentiometer (204) is set which is inserted between the output of an inverting operational amplifier (201) and a fixed positive reference voltage ($+U_R$) and whose tap is fed back by way of a diode (206) connected in the high-resistance direction with respect to the applied reference voltage directly, that is, without a series resistor, to the input (G) of this first operational amplifier (201). Both operational amplifiers (201, 202) are additionally wired, which is not specifically shown in FIG. 3, in their inverting inputs designated "1" with resistors of equal ratings, that is, as simple summing amplifiers.

For positive input signals x below the response threshold $d_2$, the diode (206) turns off and the (negative) output signal y remains zero since the two signals (x) of equal magnitude at the input of the second operational amplifier (202) just cancel each other through the direct connection on the one hand and through the inverting amplifier (201) on the other hand. When the input quantity x of the dead-band section just reaches the threshold value $d_2$, the inverted value $-d_2$ is present at the output of the first operational amplifier (201) and causes the potential at the tap of the connected potentiometer (204) to just go through zero, as a result of which the diode (206) there connected becomes conducting and short-circuits the feedback resistor of the operational amplifier (201). As a result, the output signal of the first operational amplifier (201) remains constantly at the negative threshold value $-d_2$ also for higher input signals (x$-d_2$) and is subtracted from the input value in the second operational amplifier (202) which follows. With negative input signals x of the dead-band section, the situation is similar, allowing for the threshold value $d_1$, set by means of a second potentiometer (203) and a second diode (205) connected thereto.

DESCRIPTION OF THE PREFERRED EMBODIMENTS OF THE INVENTION

In accordance with the invention, the response thresholds $d_1$ and $d_2$ of the dead-band section are to be variable. This may be accomplished, for example, by adjusting the feedback potentiometers (203, 204) in FIG. 3 through a servomotor in accordance with the following adjustment instructions on the basis of predetermined sequences of functions for the threshold values $d_l$ and $d_b$:

Pot. 203: $P_3 = d_1/(d_1 + U_R)$ (2)

Pot. 204: $P_4 = d_2/(d_2 + U_R)$

Figure 4:
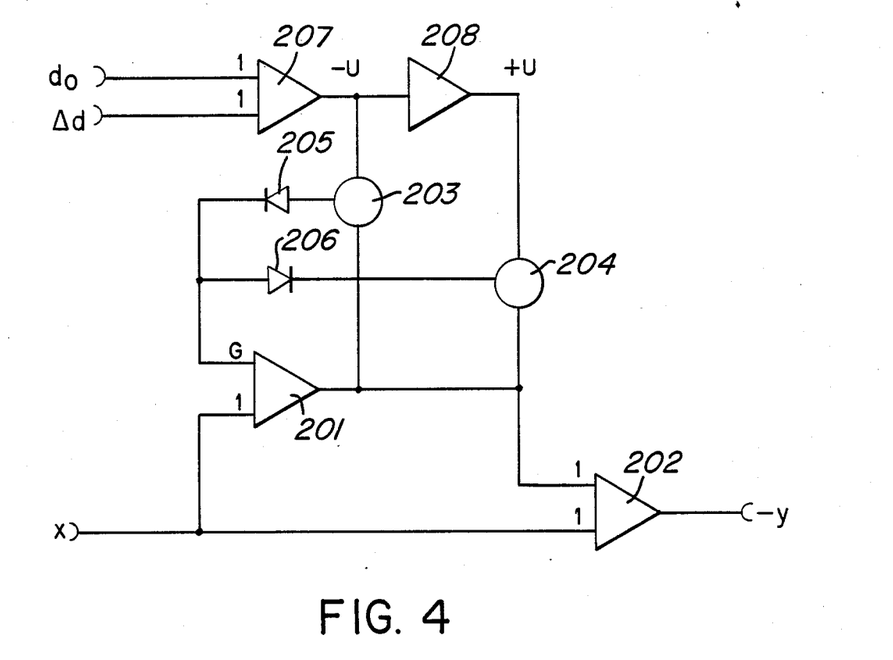
FIG. 4 showing an embodiment of an adaptive dead-band section in accordance with the invention.

FIG. 4 snows the basic circuit diagram of a considerably simpler approach to the realization of adjustable response thresholds for the simplified case of positive and negative threshold values of equal magnitude ($d_l=d_2=d$). If the potentiometer values (P) are set for the lowest threshold value ($d_0$) by assuming an associated reference voltage ($U_0$), the response thresholds (d) will shift, with an unchanged potentiometer value (P), by a value ($\Delta d$) proportionate to the variation of the reference voltage ($\Delta U$), as a simple mathematical transformation will show:

Pot. 203, 204: $P = d_0/(d_0 + U_0)$ (3)

$d = PU/(1 - P)$ $d = d_0 + \Delta d \quad d_0 = PU_0/(1 - P)$ $U = U_0 + \Delta U \quad \Delta d = P\Delta U/(1 - P)$ The nominal value ($d_0$) and the variation ($\Delta d$) of the threshold values (d) can thus be produced and introduced in a simple manner by means of additional amplifiers (207, 208) as signal-voltage variations, with observation of the signs. By the same principle, the positive and negative threshold values can, of course, also be separated, if necessary, and adjusted individually by applying appropriately differing referencevoltage variations ($\Delta U_1$, $\Delta U_2$)

Figure 6:
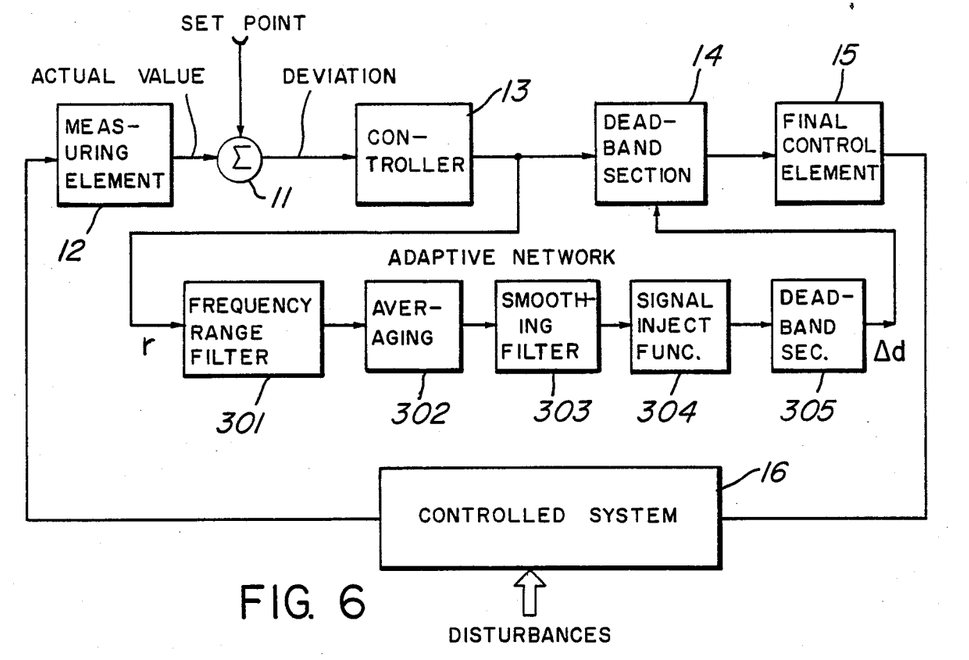
FIG. 6 showing a block diagram of a control loop of a control system in accordance with the invention.
Figure 7:
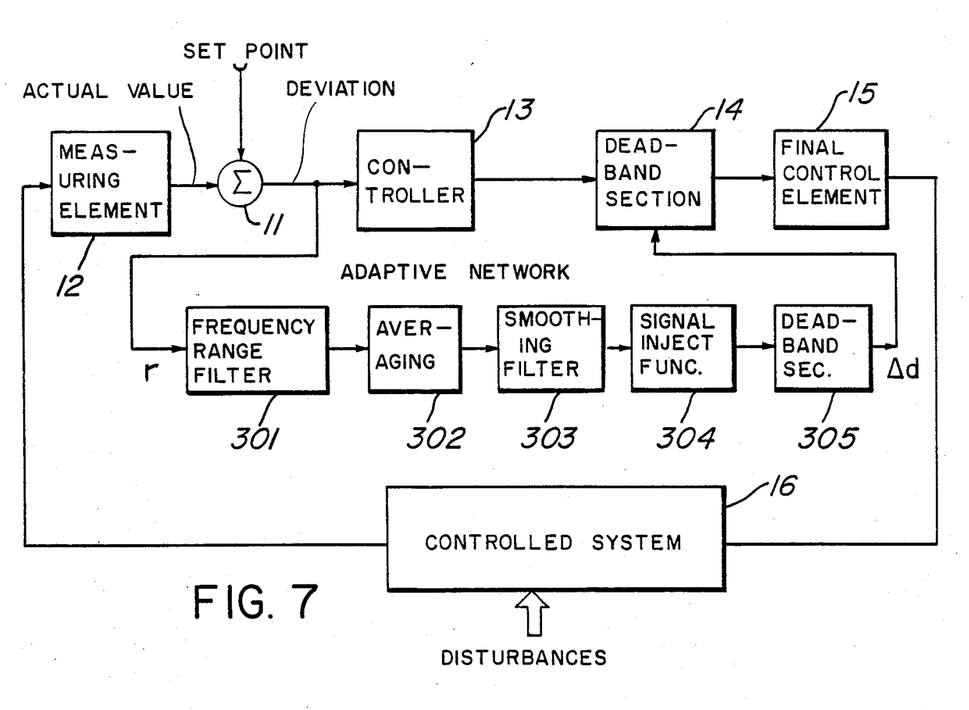
FIG. 7 showing a block diagram of a control loop in accordance with a further embodiment of the invention.

FIG. 6 shows the basic circuit diagram of an improved control system in accordance with the invention. The control loop of FIG. 1 here is expanded to include an adaptive network to which the controller output signal is fed and whose output signal in turn is used to shift the response thresholds in the dead-band section of the main loop according to FIG. 4, for example. The adaptive network itself consists of a frequency-range filter (301), an averaging circuit (302), a smoothing filter (303), a signal-injection function (304), and optionally a dead-band section (305) of a known type (e.g., FIGS. 2 and 3) with preset fixed response thresholds.

The frequency-range filter (301) serves to establish the frequency limits within which the dead band in the main control loop is to be adjusted. Preferably, high-pass filters, bandpass filters but also low-pass filters and, depending on the particular application, combinations of these types of filters are here used in a suitable series or parallel circuit. The frequency-range filters may incorporate the transfer function of the controller (13) in whole or in part. For averaging (302), all circuits or components will be suitable that are capable of forming from the frequency mixture at the output of the frequency-range filter (301) from zero various average values or DC components, for example, half-wave rectifiers, full-wave rectifiers or peak-detector rectifiers as well as functional elements forming even powers of their input signal, such as squaring circuits and the like.

In the following smoothing filter (303) of the adaptive network of FIG. 6, the output signal of the averaging circuit is smoothed, or signal components of undesired frequencies, for example, high frequencies, are suppressed, for which purpose low-pass filters of first and higher order or band-reject filters are particularly well suited.

By means of the signal-injection function (304) of the adaptive network it is established on the basis of which functional relationship the response thresholds of the deadband section in the main control loop are to be adjusted. In the simplest case, a simple linear amplification characteristic with output-signal limiting may here be involved, with the limiting assuring that no undesirably large broadening of the dead-band range and attendant reduction in accuracy of control can occur. Generally, however, appropriate nonlinear gain characteristics such as inverse-square law characteristics corresponding to square-root functions, logarithmic characteristics or functions and the like will be better suited for meeting the requirements in a given case. In many cases it will be advisable in accordance with the invention to insert after the signal-injection function a dead-band section (305) with nonvariable response thresholds for suppression of the residual ripple of the adjusting signal and to provide for a specific lower threshold value of the adjustable dead-band section (14) in the main control loop. This additional deadband section may be inserted in the particular adaptive network also between the frequency-range filter and the averaging circuit, between the averaging circuit and the smoothing filter, or between the smoothing filter and the signal-injection function.

Figure 8:
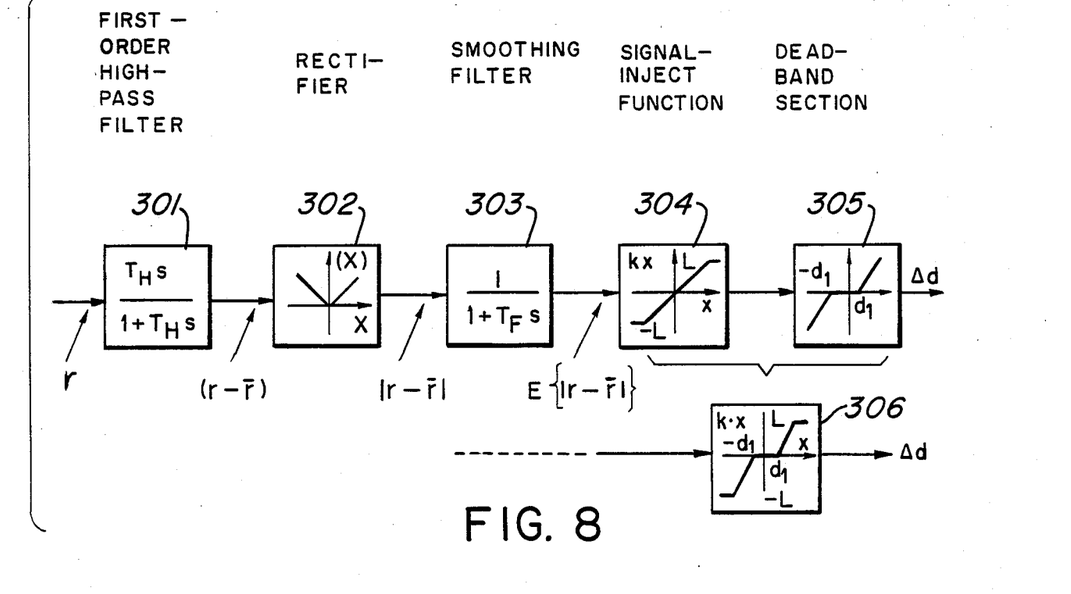
FIG. 8 showing a functional diagram for an embodiment of the control system in accordance with the invention.
Figure 9:
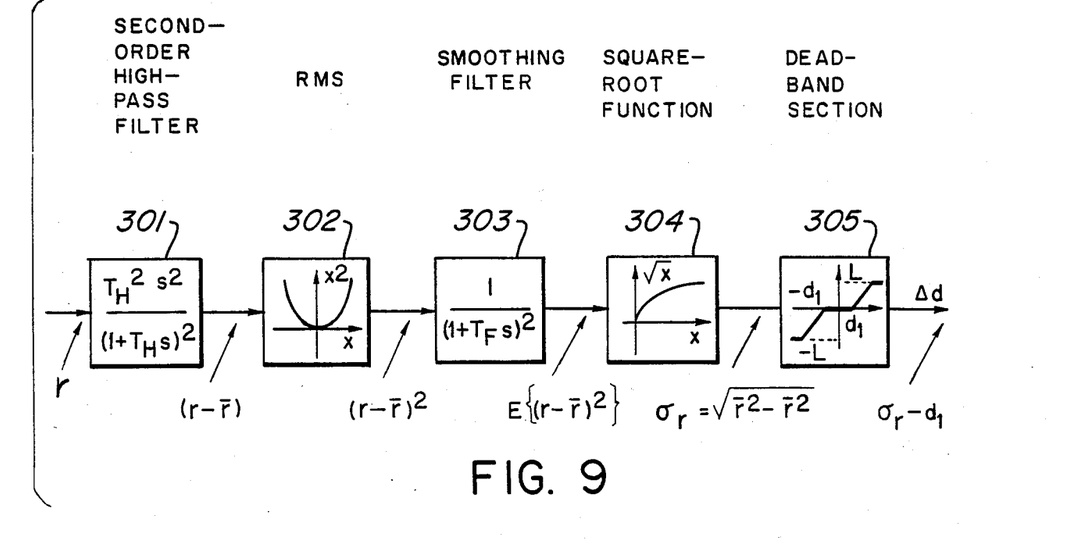

Shown in FIGS. 8 and 9 are two embodiments of the adaptive networks of the invention. To illustrate the functional characteristics described above, the individual circuit elements are shown in the form of transfer functions or input/output characteristics.

FIG. 8 shows an adaptive network of the simplest design which consists of a first-order high-pass filter as a frequency-range filter (301), a full-wave rectifier (302) as an averaging circuit, a first-order low-pass filter as a smoothing filter (303), an amplifier with a general gain constant K and amplitude limiting L as a signal-injection function (304), and a dead-band section (305) symmetrical with respect to zero, with equal positive and negative response thresholds ($\pm d_1$)

In FIG. 9, the adaptive network consists of a second-order high-pass filter as a frequency-range filter (301), a squaring circuit for averaging (302), a second-order low-pass filter as a smoothing filter (303), a square-root-forming circuit as a signal-injection function (304), and following it a dead-band section (305) with output-signal limiting (L).

In the two embodiments of FIGS. 8 and 9, the high-pass filters as frequency-range filters form from their input signals r, by suppression of the low-frequency components, signals which correspond to the deviation (r−r) from the linear average or expected value ($E\{r\}=r$). Through the following nonlinear operations of rectification or squaring in the averaging circuit (303), DC components or rms values are again formed on which high-frequency signal components are impressed. The high-frequency signal components are suppressed by the lowpass filters as smoothing filters (303), which corresponds to the formation of an expected value ($E\{\equiv r - \bar{r} \equiv\}$, $E\{(r-\bar{r})^2\}$). According to FIG. 8, the response thresholds of the dead-band section (14) in the main control loop are varied proportionally (factor K) to the signal obtained up to a predetermined maximum value L, which limits the permissible upward enlargement of the dead band, while the lower threshold of the adaptive intervention is fixed by the following dead-band section (305), which is set to fixed values.

Because of the shape of the signal-injection function (304) corresponding to a square-root function according to FIG. 9, the adjustment of the response thresholds in the main control loop is effected for all signals from the selected frequency spectrum according to the "variance" ($\sigma_r$) in the case of randomly fluctuating quantities, or according to the rms value in the case of sinusoidal signal components.

With appropriate damping of the undesired signal components in the smoothing filter, the dead-band section (305) with fixed settings in the adaptive network may be dispensed with in many cases. In other applications, it will be advisable to reverse the sequence of the circuit elements dead-band section (305) and signal-injection function (304) or to combine them, in accordance with FIG. 8, to a single transfer element (306) equivalent to them in function.

The hardware implementation of the functional elements of the adaptive network described above with respect to their principle of operation and their transfer characteristics, such as filters, rectifiers, and linear and nonlinear input/output characteristics, will pose no problems to one skilled in the art. Similarly, one skilled in the art will be conversant with the translation of the filter transfer functions and transfer characteristics, supplied in analog representation, to equivalent digital circuits or algorithms for process computers as electronic control systems. Transfer functions can readily be represented by solution, through numerical integration procedures or through transition matrices, of the linear differential equations representing them.

For the realization of logic functions, nonlinear characteristics and algebraic computing operations such as squaring, root extraction, etc., digital aids are generally better suited anyhow than analog aids. In many cases it will suffice to conventionally use, in place of demanding and timeconsuming computer routines, simple approximations, such as replacing the integration of a signal quantity r by summation of a sufficiently large number N of samples for the formation of averages or expected values ($E\{r\}$, $E\{(r-\bar{r})^2\}$) in accordance with the specification $$E\{r\} = \bar{r} = \frac{1}{T} \int_0^T r(t)dt = \frac{1}{N} \sum_{i=1}^{N} r(t_i) = \frac{1}{N} \sum_{i=1}^{N} r_i \quad (4)$$

for the linear average or expected value, or $$E\{(r-\bar{r})^2\} = \sigma_r^2 = \frac{1}{T} \int_0^T (r-\bar{r})^2 dt = \frac{1}{N} \sum_{i=1}^{N} (r_i - \bar{r})^2 \quad (5)$$

for the root-mean-square or expected value, with $r_i = r(t_i)$ representing the functional values r for the sampling times $t_i$.

In other cases, it will be advisable to use iterative processes and/or recurrence formulas, for example, for formation of the square-root function the iterative solution of a relation with the formula $$x_{n+1} = \frac{1}{2}\left(x_n + \frac{a}{x_n}\right) \quad (6)$$

where a is the argument of the function, $x_n$ is the result of the preceding iterative step, and $x_{n+1}$ is the corrected functional value of $\sqrt{a}$. The argument a of the function can also be used as the initial value (n=0), and the iteration can be terminated when the variation of the functional value ($x_{n+1} - x_n$) of two successive iterative steps drops below a predetermined level of accuracy.

Control systems in accordance with the invention which are provided with adaptive dead-band sections and with adaptive networks controlling their response thresholds have substantial advantages over conventional systems and are suited for use in both linear and highly nonlinear control systems. Through the analysis, evaluation and weighting of the signal components of the main control loop over selected frequency ranges performed in the adaptive network and through the adaptation of the range of the dead band to the instantaneous conditions, a substantial improved is generally achieved, and as a minimum nonvarying quality of the control behavior even with changing operating and environmental conditions.

For example, when an adaptive dead band is introduced into a linear control system, in contrast to conventional practice, and a value that is smaller than or equal to the variance $\sigma$, that is, the so-called one- (or two-) $\alpha$ value of the lowest system and measured-value noise to be expected under any operating conditions, is selected as its lowest adjustable value, the higher amplitudes of high-frequency disturbances will always exceed the response thresholds of the dead-band section in the main control loop and thus produce a linearization effect which effectively prevents the dead band from manifesting itself, has practically no effect on the linearity of the loop, and does not give rise to undesirable limit-cycle vibrations, yet results in a substantial reduction of the noise level, which in the case of stochastic disturbances with Gaussian distribution amounts to 68% or 95.5%, respectively, and has a beneficial effect on the dynamics of the system and on the consumption of corrective energy. When the noise level increases as a result of the operating conditions, for example, due to temperature fluctuations, then, with appropriate design of the adaptive network, the dead band is readjusted and the favorable control-loop behavior is thus maintained.

Nonlinear control systems which, with a view to saving corrective energy or to using intermittently operating final control elements such as pulsed jet nozzles, are deliberately provided with an effective dead band can be optimally adjusted for the desired behavior with respect to accuracy, corrective energy consumption, limit-cycle frequency and amplitude when the adaptive control system of the invention is employed since the effective component of the dead band remaining between the noise level and the response thresholds is preserved even when the measured-value noise and the dynamics of the control loop are altered as a result of automatic adaptation.

In control systems of this type, the electric actuating pulses for intermittently operating final control elements, such as stepper motors or jet nozzles, are often generated by means of special modulator circuits such as pulse-duration and pulse-frequency (PD/PF) modulators or so-called pseudo-rate (PR) mopdulators incorporating a three-point element with hysteresis. To reduce the cost of implementation to a minimum while essentially utilizing the idea underlying the invention, the adaptive intervention is advantageously effected directly in the three-point element in such a way that the response thresholds and the turn-off thresholds of the hysteretic three-point element are shifted equally in the same direction on the basis of the adjusting signal so that the width of the hysteresis loop remains unchanged.

Despite the intervention in an element with such a high degree of nonlinearity as the three-point hysteresis element, the act of adaptive parallel shifting of response threshold and turn-off threshold does not affect the amplitude and phase ratios in the modulator circuit since the phase ratios are solely dependent on the width of the hysteresis loop and the actually effective dead band also remains intact. Thus the nonlinear modulator circuit retains in a verifiable manner also its dynamic properties.

Figures 10, 11:
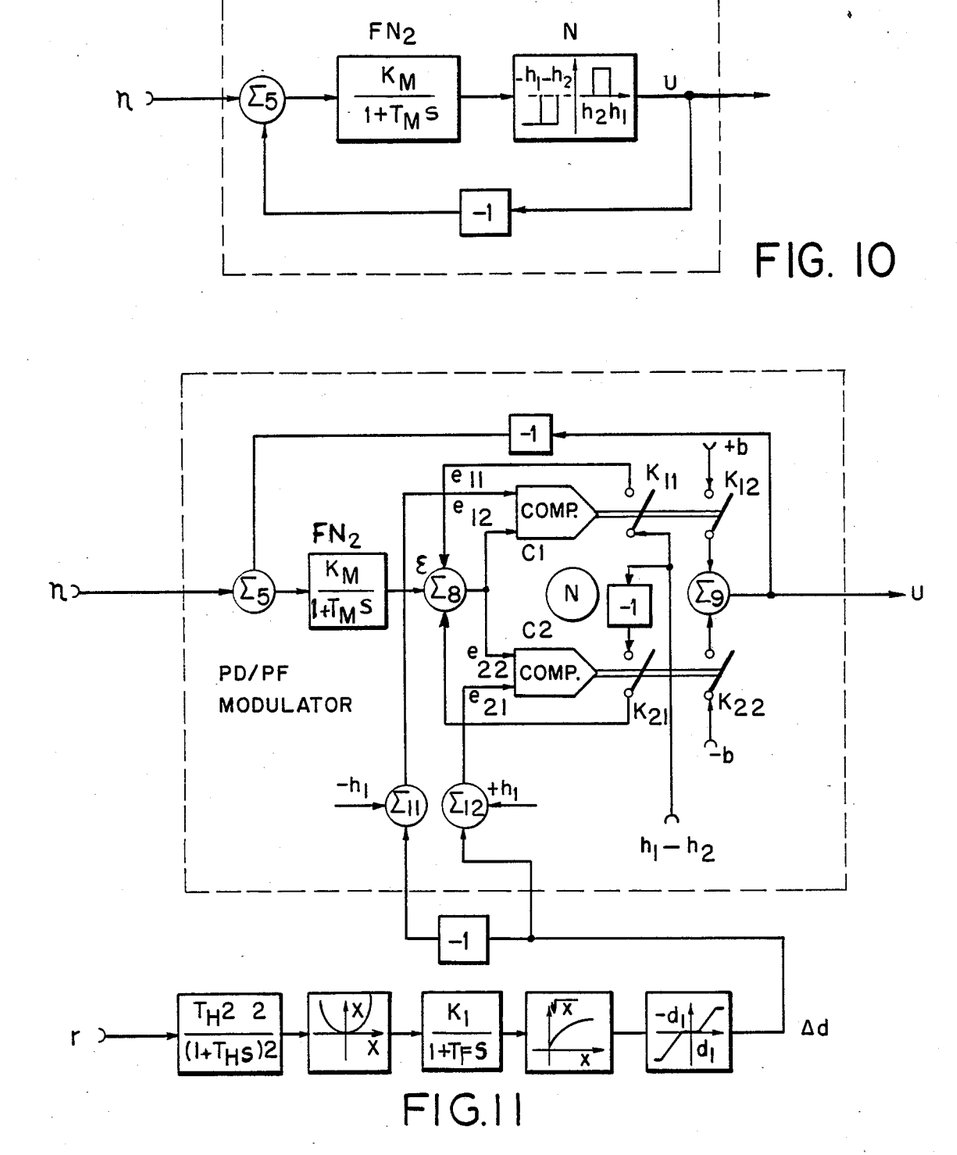

FIG. 10 shows a control-engineering block diagram of a conventional PD/PF modulator while FIG. 11 shows a functional diagram of an adaptive PD/PF modulator of the type mentioned. Shown in the upper part of FIG. 11 is the normal, nonadaptive PD/PF modulator consisting of the modulator network $FN_2$, the nonlinear hysteretic three-point element N and the negative feedback of the output signal u to the summing point $\Sigma_5$ at the input $\eta$. The hysteresis characteristic N is essentially implemented by means of two comparators $C_1$ and $C_2$, of which the upper one, $C_1$, closes the contacts $K_{11}$ and $K_{12}$ connected to it when the sum of the two inputs of $C_1$ becomes positive and the lower one, $C_2$, closes the contacts $K_{21}$ and $K_{22}$ when the sum of its inputs becomes negative. At one of the two comparator inputs $e_{11}$ and $e_{21}$, a fixed value is present, namely, the hysteresis response threshold $-h_1$ at $C_1$ and $+h_1$ at $C_2$. The other input $e_{12}$ or $e_{22}$ is controlled by means of the input signal $\eta$ and the width of the hysteresis loop $h_1-h_2$. When the input signal $\eta$ is positive, for example, the controlled input $e_{12}$ of the upper comparator $C_1$ goes up with the delay of the modulator network $FN_2$ until the amount of the threshold value $-h_1$ is reached and the comparator $C_1$ responds. Through the attendant closing of one of the contacts, $K_{11}$, a signal corresponding to the hysteresis width $h_1-h_2$ is fed back, by way of a summing element $\Sigma_8$, to the controlled comparator input $e_{12}$. Through the second contact, $K_{12}$, the pulse signal b is simultaneously fed to the output u by way of the summing element $\Sigma_9$ and through the negative feedback subtracted in the summing element $\Sigma_5$ from the input signal $\eta$. The (negative) difference $\eta-b$ results through the modulator network $FN_2$ and the summing element $\Sigma_8$ in a delayed dropping of the controlled input $e_{12}$ of the comparator $C_1$. The latter again drops and consequently opens the contacts $K_{11}$ and $K_{12}$ when the sum of its inputs $-h_1+h_1-h_2+\epsilon$ reaches the value zero. This will be the case when the output signal $\epsilon$ of the modulator network $FN_2$ reaches the turn-off threshold $\epsilon=h_2$. At the same time, the modulator output signal u falls back to zero, thus terminating the corrective intervention. The process is repeated at regular intervals if the input signal $\eta$ remains positive, a constant input signal $\eta$ resulting in a sequence of pulses of constant duration and frequency. The situation is the same with negative input signals involving the other comparator $C_2$ and the associated contacts $K_{21}$ and $K_{22}$. The adaptive network for implementation of the adaptive measure whose effects have already been described is diagrammatically illustrated in the lower part of FIG. 11 and acts upon the dead-band response thresholds $(+h_1$ and $-h_1)$, which are symmetrical with respect to the zero point. Since the preset value of the width $h_1-h_2$ of the hysteresis loop is not affected thereby, the turn-off thresholds $(+h_2$ and $-h_2)$ also shift by the same amount with correct signs.

The system in accordance with the invention can be used to particular advantage in the stabilization of controlled systems which because of their mechanical design, the properties of their materials, their light, weight-saving construction and/or their small diameter are subject to structural vibrations, especially with a low degree of passive damping. If through judicious choice of the cutoff frequencies these vibrations fall within the pass band of the frequency-range filters and the following circuit elements of the adaptive network are designed so that the main control loop does not react to structural vibrations as a result of adaptive intervention, then limit-cycle vibrations with attendant high corrective energy consumption, dangerous loading of structures and oscillatory instabilities cannot occur at structural resonance frequencies.

Now if for an easier understanding of the idea underlying the invention a control loop which as such is linear and which normally should not contain an effective dead band is considered, a dead-band section in the main control loop which has been introduced for the stabilization of structural vibrations is preferably readjusted so that the amplitudes of the structural vibrations in the controller output signal are just below the response thresholds. The high-frequency oscillatory signal components then have a linearizing effect over the full range of the dead band, much like a so-called dither signal, but do not interfere with low-frequency control motions on which the oscillatory signals are impressed in the main loop because the adjustment of the dead band is based only on the amplitudes of the high-frequency signal components as a result of the frequency-range selection in the adaptive network. For signals from the spectrum of frequencies determined by the adaptive network, the amplification in the main control loop thus is practically zero, as a result of which any accidentally excited structural vibrations will decay through self-damping. The range of the dead band then is also reduced to the same extent and a constant control behavior is assured. The control system of the invention thus makes it possible to use simpler and proven control concepts which in themselves are only suited for the control and stabilization of rigid vehicles also for the control of elastic vehicles which otherwise would require much more complex controller configurations such as modal controllers, for example. In the present case, it may also be advisable to change the sequence of the circuit elements, for example, by inserting the dead-band section preset to a fixed value between the frequency-range filter and the averaging circuit in the adaptive network, which may be done in order that the adjustment of the dead band becomes effective only when certain noncritical structural vibration amplitudes predetermined by means of the response thresholds are exceeded. In addition to the circuit elements shown in the embodiments, band-pass filters, band-reject filters and the like, alone and in an appropriate series and parallel circuit, are here suited in particular for use as frequency-range filters for the separation of various frequency ranges and/or as smoothing filters, and peak-detector rectifiers for use as averaging circuits. A logical extension of the idea underlying the invention leads to the connection in parallel of complete adaptive networks effective over various frequency ranges and the superimposition of their interventions on the dead-band section of the main loop.

Figure 5:
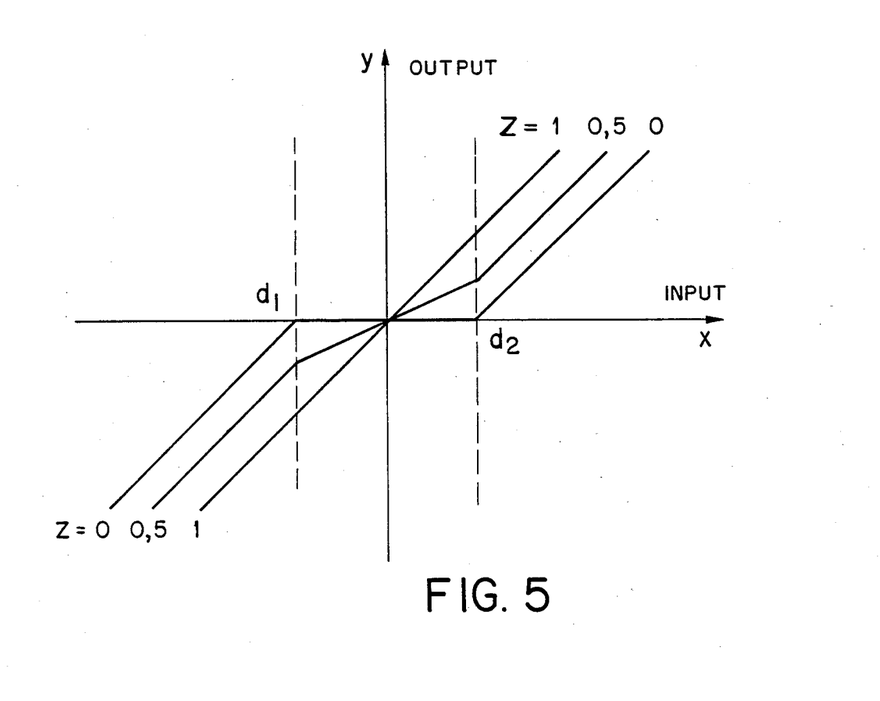
FIG. 5 showing an input/output characteristic of a dead-band section with an adaptive slope of the characteristic between the response thresholds in accordance with the invention.

The stabilization described above of structural vibrations in elastic vehicles by means of an adaptive dead-band section, coupled with an improvement of the control-loop behavior over conventional systems, can be accomplished also in another way. Since the stabilizing effect is brought about by decreasing the control-loop amplification for structural-vibration amplitudes over the range of the dead band, it is also conceivable to alter the shape of the characteristic of the dead-band section between the response thresholds by means of the adjusting signal in the sense of an amplification adjustment, for example, in conformity with the specification see FIG. 5):

$$y = \begin{array}{ll} x - (z - 1)|d_1| & fUr\ x < d_1 \\ zx & fUr\ d_1 \leq x \leq d_2 \\ x + (z - 1)|d_2| & fUr\ x > d_2 \end{array} \quad (7)$$

where x represents the input quantity, y represents the output quantity, $d_1$ and $d_2$ represent the lower and upper fixed limit, respectively, of the adjusting range, and z represents the adaptive parameter ($\Delta d$) formed in one of the adaptive networks described, with $$z_1 \leq z \leq z_2$$

and in particular with $z_1 = 0$ and $z_2 = 1$. A family of characteristic curves of the adaptive transfer element with variable amplification which corresponds to these relationships is diagrammatically shown in FIG. 5 for three values of the adaptive parameter (z=0, 0.5, and 1). For values of the adaptive parameter of $z \neq 0$, the transfer element represents an adaptive proportional element with a variable proportionality factor within the range $d_1 \leq x \leq d_2$ and a fixed proportionality factor outside that range and degenerates to a dead-band section according to FIGS. 2 to 4 for the value z=0 of the adaptive parameter. The implementation of such a functional element in conformity with the specification of Eq. (7) in a digital computer is obvious. The design of a corresponding analog circuit with the aid of a multiplier will also present no difficulties to one skilled in the art.

The last-mentioned embodiment of the invention suggests itself for the suppression of low-frequency continuous vibrations in the attitude control of vehicles. The mathematical description of such controlled systems is characterized by double-integral behavior, which takes into account the physical circumstances of the effect of corrective forces or moments on position or angular position. As every control engineer knows, limit-cycle vibrations are unavoidable in such a system when there is a dead band in the control loop and in addition an integral controller is used to achieve high static accuracy. Now if the adaptive network is designed in such a way, by judicious choice of the frequency-range filter as a low-pass filter, that it responds to low-frequency vibratory processes of the vehicle and the adaptive signal (z) is used to vary the slope in the characteristic range $d_1 \leq x \leq d_2$ of the transfer element according to FIG. 5 in the same direction, then a stable state is established which tolerates no limit-cycle vibrations since a dropping of the circuit amplification below the so-called lower stability limit is prevented by the adaptive process.

Figure 12:
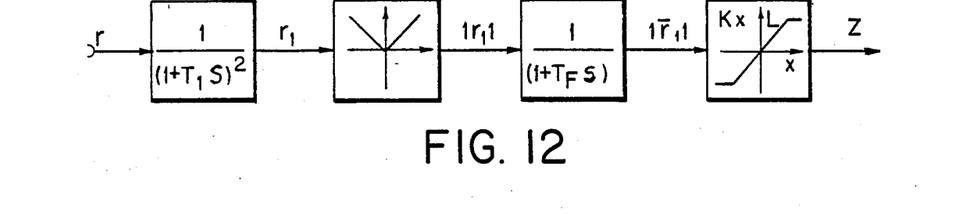

FIG. 12 illustrates an adaptive network of the above type. It consists of a second-order low-pass filter, a rectifier as an averaging circuit and a further low-pass filter as a smoothing filter as well as of an appropriate amplification characteristic whose shape depends on the sensitivity of the stability variation at the lower stability limit and in the simplest case can be implemented through a simple linear amplification factor with limiting (L).

It is readily apparent that the combination of different features of the invention, and in particular an adjustment of the threshold values $d_1$ and $d_2$ as well as of the slope of the characteristic in the range between them ($d_1 \leq x \leq d_2$), on the basis of signals (z, $\Delta d$) formed in associated adaptive networks from the controller output signal and/or the deviation can result in substantial additional practical advantages.

The adjustment need not always be in the same direction, that is, increasing magnitude of the threshold values $d_1$ and $d_2$ or an increasing slope (z) of the characteristic with increasing values of the adaptive signal (z, $\Delta d$); rather, combinations of adjustments in opposite directions for overlapping or mutually exclusive partial ranges of the adjustment over selected frequency ranges or amplitude ranges may be indicated.

It is expressly pointed out that the relatively simple versions primarily used in control engineering of the types of filters repeatedly referred to are not the only ones that are suitable for the purpose in accordance with the invention, for which all active or passive filter networks commonly used in communication engineering, such as Tschebychev filters, Cauer parameter filters, Butterworth filters, notch filters and the like can also be used. Because of their large phase losses in the pass band or their resonance characteristics, they have only limited use in control engineering. If they can be used in conjunction with the present invention, it is because so far as the adaptive signal is concerned, only the amplitude relations of the signals from the selected frequency ranges are controlling, not their phase relations.

The invention makes a wide variety of options available to the control engineer for improving conventional linear and nonlinear control systems with respect to their accuracy, their corrective energy consumption, their stability and their sensitivity to fluctuations of the operating and environmental conditions. The dimensioning of the adaptive network should be based on the signal spectrum of the main control loop, and the conditions of adaptation will depend on the amplitude relations of the signals at the frequencies involved or over the appropriately selected frequency ranges. From the desired mode of action as described in the specification, it is apparent that the bandwidth of the adaptive signal ($\Delta d$ in FIGS. 8 and 9) should always be considerably lower, that is, by a factor of from five to ten, so far as order of magnitude is concerned, than the lower cutoff frequency of the frequency range in the main control loop selected and controlling for the adaptation.

We claim:

1. A control system comprising a main loop; said main loop comprising a controlled system generating an output in response to disturbances, comparison means connected to receive the output from the controlled system and a predetermined reference value and generate a deviation signal, a controller having an input connected to receive the deviation signal and having an output, a main deadband section connected to the controller output and having an input, and a final control element assembly connected to the deadband section and to the controlled system to reduce the effect on the controlled system of the disturbances; and an adaptive network connected between the controller output and the main deadband section input, said main deadband section having response threshold values adjustable between a preset fixed lower limit and a preset fixed upper limit; said adaptive network having means for deriving from the controller output signal or from the deviation signal and from averaging all signal components located within at least one selected frequency range thereof an adaptive signal, said adaptive network further having means for introducing said adaptive signal into the main deadband section for varying its threshold values in a continuous or discrete stepped manner between its lower and upper limits in accordance with a given functional relationship.

2. The system of claim 1 wherein the adaptive network's introducing means is arranged to add the value of the adaptive signal to the lower limit of the deadband section.

3. A control system according to claim 2, wherein the main deadband section comprises first and second amplifiers each having an input and output, two potentiometers connected, respectively, in series with oppositely-wired diodes and connected between the output and input of the first amplifier, and also connected to the input of the second amplifier, means connecting the input signal from the controller to the input of the first and second amplifiers, and means connecting the adaptive signal to the potentiometers.

4. A control system as claimed in claim 3, wherein the last-named means comprises third and fourth amplifiers.

5. A control system as claimed in claim 1 wherein the introducing means for the adaptive signal causes an increase in the portion of the characteristic of the deadband section forming a straight line between its lower limit and its upper limit, whereby the deadband section between its response thresholds behaves as a comparison element with variable amplification factor, the slope of said characteristic between the response thresholds being given by the value of the adaptive signal.

6. A control system according to claim 1 wherein said adaptive network comprises, from input to output, a frequency range filter, averaging means, a smoothing filter, and signal injection means.

7. A control system according to claim 6, wherein the adaptive network further comprises an additional deadband section whose response thresholds are adjustable to preset fixed values.

8. A control system according to claim 7, wherein the additional deadband section is connected directly before or after the signal injection means.

9. A control system according to claim 6, wherein the frequency range filter comprises a filter selected from the group consisting of a high-pass filter, a bandpass filter, a low-pass filter, a band-rejection filter, and combinations thereof.

10. A control system according to claim 9, wherein the frequency range filter incorporates a transfer function.

11. A control system according to claim 6, wherein the averaging means comprises a circuit selected from the group consisting of a half-wave rectifier, a full-wave rectifier, a peak rectifier, and functional elements forming even-numbered powers of their input signal.

12. A control system according to claim 6, wherein the smoothing filter comprises a filter selected from the group consisting of a low-pass filter, a band-rejection filter, a bandpass filter, and combinations thereof.

13. A control system according to claim 6, wherein the signal injection means has a linear or nonlinear characteristic.

14. A control system according to claim 1, wherein the adaptive network comprises, from input to output, a first-order high-pass filter as a frequency range filter, a full-wave rectifier as an averaging circuit, a first-order low-pass filter as a smoothing filter, an amplifier with amplitude limiter as a signal-injection means, and an additional deadband section with preset fixed response thresholds.

15. A control system according to claim 1, wherein the adaptive network comprises, from input to output, a second-order high-pass filter as a frequency-range filter, a squaring circuit as an averaging circuit, a second-order low-pass filter as a smoothing filter, a square-root function as a signal injection function, and an additional deadband section with preset fixed response thresholds and amplitude limiting.

16. A control system according to claim 1, wherein the adaptive network comprises a signal injection function that sets the response thresholds in the main deadband section in such a way that the response thresholds are at all times proportional to a statistical expected value or to a root-mean-square value of the controller output signal over at least one selected frequency range.

* * * * *